(12) United States Patent
Merrett et al.

(10) Patent No.: US 10,897,182 B1
(45) Date of Patent: Jan. 19, 2021

(54) INTEGRATED, VARIABLE FLUX PATH ELECTRICAL GENERATOR FOR TURBINE ENGINES

(71) Applicant: Government of the United States, as represented by the Secretary of the Air Force, Wright-Patterson AFB, OH (US)

(72) Inventors: Joseph Merrett, Decherd, TN (US); Serhiy Leontsev, Dayton, OH (US); Daniel Gillaugh, Troy, OH (US); Kevin Yost, Beavercreek, OH (US); Gregory Minkiewicz, Springfield, OH (US); James Hendershot, Jr., Osprey, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/819,240

(22) Filed: Mar. 16, 2020

Related U.S. Application Data

(63) Continuation of application No. 15/243,518, filed on Aug. 22, 2016, now abandoned.

(51) Int. Cl.
*H02K 7/14* (2006.01)
*H02K 7/18* (2006.01)

(52) U.S. Cl.
CPC ................. *H02K 7/1823* (2013.01)

(58) Field of Classification Search
CPC .......... H02K 1/28; H02K 23/44; H02K 29/00; H02K 19/10; H02K 19/02; H02K 29/06; H02K 21/26; H02K 21/00; H02K 21/02; H02K 16/04; H02K 3/28; H02K 7/1823; B61C 9/38; B63H 23/10; B63H 21/20; B60L 11/02
USPC ................................. 310/112–114
See application file for complete search history.

(56) References Cited

U.S. PATENT DOCUMENTS

2011/0109185 A1* 5/2011 Sullivan ............... H02K 21/24
310/156.35

* cited by examiner

*Primary Examiner* — Tran N Nguyen
*Assistant Examiner* — Leda T Pham
(74) *Attorney, Agent, or Firm* — AFMCLO/JAZ; Matthew D. Fair

(57) ABSTRACT

A power producing apparatus includes a stator portion having a stator ring disposed proximate a housing of a turbine engine. The stator potion further includes a plurality of coils. A rotor portion includes a rotor ring having a plurality of permanent magnets disposed coaxial to the plurality of coils, and the permanent magnets are oriented with alternating polarity. Individual or a plurality of coils are configured to be selectively moved axially with respect to the rotor ring.

6 Claims, 8 Drawing Sheets

INTEGRATED, VARIABLE FLUX PATH ELECTRICAL GENERATOR FOR TURBINE ENGINES

RIGHTS OF THE GOVERNMENT

The invention described herein may be manufactured and used by or for the Government of the United States for all governmental purposes without the payment of any royalty.

FIELD OF THE INVENTION

The present invention relates generally to aeronautical power production and, more particularly, to direct drive generation of electric current from turbine engines.

BACKGROUND OF THE INVENTION

The electrical power demands of modern aircraft, to include those demands associated with DoD aircraft, are ever increasing. In addition to the rising magnitude of these power loads, the number of flight-critical electrical power loads is increasing as well. For example, fighter aircraft are aerodynamically unstable and require computer controlled corrections to the flight control surfaces. As a result, many systems require redundant components, with resultant power demands. The More Electric Aircraft (MEA), adopted by the DoD for the F35 and future advanced fighters, relies heavily on electric actuation to move flight surfaces. This creates a situation where the electrical power system must provide power to rapidly changing, high power, flight critical loads. Therefore, more electrical power output is required while simultaneously demanding enhanced reliability, improved weight management, and volume minimization. Achieving this goal with current generator technology is made more difficult for 5th and 6th generation stealth aircraft because of the added thermal management difficulties associated with these platforms.

Currently, electric generators in the aviation industry are propelled via a shaft that is geared to the secondary shaft of the jet engine. This configuration necessitates one or more gear boxes and an accompanying oil circulation system for lubricating and cooling the generator. Conventional generators are typically wound-field synchronous machines and therefore rely primarily on internal electromagnets to generate magnetic flux. High power densities can be achieved with this type of generator.

However, for a fixed volume and mass, a permanent magnet generator can achieve a higher power output than an electromagnet-based machine. True permanent magnet generators have previously been deemed a safety risk in the aerospace industry because the flux of the magnets cannot be turned off and will therefore continue to induce a voltage in the coils as long as the engine is rotating. In the event of a shorted coil, the inability to terminate power production yields a very real fire hazard.

Many aircraft that rely upon gearbox driven generators require an emergency power unit to supply required electricity in the event of an engine failure. Such configurations often require hazardous fuels, and provide no power contributions to the aircraft except during emergency use.

As a result, there exists a need in the art for an aeronautical power production system capable of providing operational power and emergency power while simultaneously reducing the volume, weight, cooling demands, and mechanical complexity of gearbox driven external generators.

SUMMARY OF THE INVENTION

The present invention overcomes the foregoing problems and other shortcomings, drawbacks, and challenges of gearbox driven generators. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a power producing apparatus is provided. The apparatus includes a stator portion having a stator ring disposed proximate a housing of a turbine engine. The stator portion further includes a plurality of coils. A rotor portion includes a rotor ring having a plurality of permanent magnets disposed coaxial to the plurality of coils, and the permanent magnets are oriented with alternating polarity. One of the plurality of coils is configured to be selectively moved axially with respect to the rotor ring.

According to another embodiment of the disclosed invention, a power producing apparatus is provided. The apparatus includes a stator portion having a stator ring disposed proximate a housing of a turbine engine, and the stator portion further includes a plurality of coil pairs. A rotor portion includes a rotor ring having a plurality of permanent magnets disposed coaxial to the plurality of coil pairs, and the permanent magnets are oriented in a Halbach array. One of the plurality of coil pairs is configured to be selectively moved axially with respect to the rotor ring.

According to another embodiment of the present invention, a power producing apparatus is provided. The apparatus includes, a rotor portion having a rotor ring mated to a rotating portion of a turbine engine. The rotor ring has a plurality of permanent magnets disposed therein in an alternating polarity pattern. A stator portion includes a first stator ring disposed coaxial with, and forward of, the rotor ring, and the first stator potion includes a plurality of first split coil portions. The stator portion further includes a second stator ring disposed coaxial with, and aft of, the rotor ring, and the second stator ring includes a plurality of second split coil portions. The first stator portion and cooperating first split core portions, are configured to selectively rotate coaxially with respect to the second rotor portion and cooperating second split core portions to adjust a coil offset distance.

According to yet another embodiment of the disclosed invention, a power producing apparatus is provided. The apparatus includes a stator portion having a stator ring mated proximate a housing of a turbine engine, and the stator ring has a plurality of coils disposed therein. A rotor portion is coupled to a rotating component of a turbine engine, and the rotor portion includes a first rotor ring disposed coaxial with, and forward of, the stator ring. The first rotor portion includes a plurality of permanent magnets oriented with alternating polarities. The rotor portion further includes a second rotor ring disposed coaxial with, and aft of, the stator ring, and the second rotor ring includes a plurality of permanent magnets oriented with alternating polarities as compared to the permanent magnets of the first rotor ring. The coils are configured to be selectively (or in total) reciprocated axially with respect to a central axis.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

DETAILED DESCRIPTION OF THE INVENTION

Figure 1:
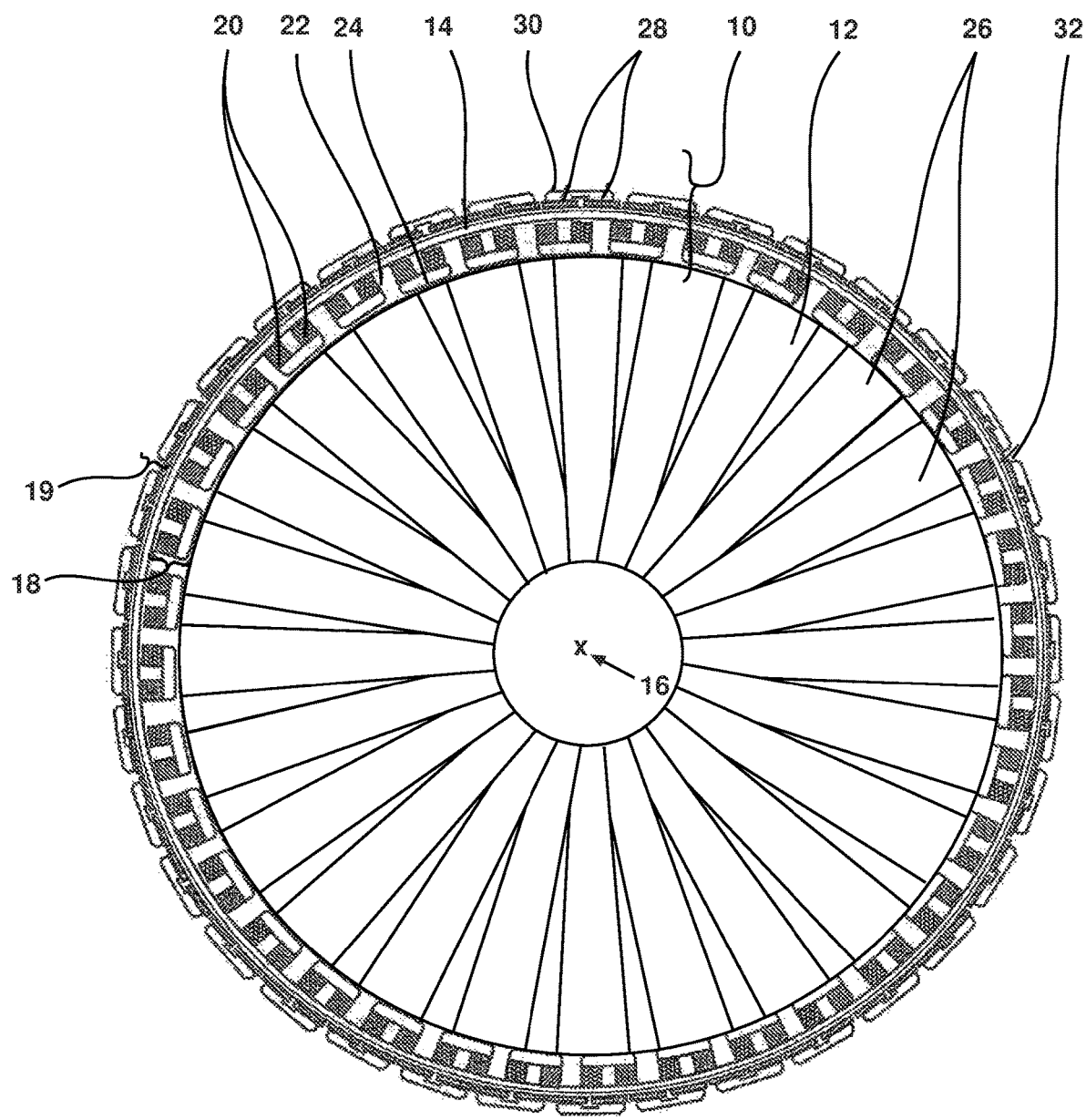
FIG. 1 depicts an embodiment of the disclosed invention including permanent magnet pairs and cooperating bridges.

Turning attention to FIG. 1, an embodiment of the disclosed power generating apparatus 10 is shown coupled to a fan 12 and a housing 14 of a turbofan engine. The fan 12 revolves around a central axis of rotation 16. It should be noted that the following descriptions may focus upon integrating embodiments of the disclosed invention with respect to a turbofan engine, it will be recognized by one of ordinary skill in the art that the benefits of the invention may be realized in conjunction with any turbine engine in both aeronautical and terrestrial applications.

A rotor portion 18 of the disclosed invention includes permanent magnets 20 disposed along the periphery of the fan 12 having alternating polarity orientations. The magnets 20 are embedded in a non-ferrous rotor ring 22. Suitable rotor ring 22 materials would be any nonmagnetic material with sufficient strength to retain the magnets 20 under rotation. Titanium would be one such material. Carbon fiber composite would also be a good choice as an outer retaining layer to hold the magnets 20 in place. The innermost radial face of each of the paired magnets 20 (the two magnets of the pair being oriented with opposite polarity) may be joined with a soft magnetic material bridge 24 (or "back iron") configured to concentrate the lines of flux emanating from the pair of magnets 20. Likewise, the soft magnetic material bridge 24 be used to connect the innermost radial faces of all of the magnets 20 with similar effect. In some embodiments, the soft magnetic material may have high magnetic permeability, which is referred to in more details below. The rotor ring 22 is mated to each of the blades 26 of the fan 12, as well as to the magnets 20, such that the fan 12 and cooperating blades 26 rotate at the same angular velocity as the magnets 20 and rotor ring 22.

Similarly, a stator portion 19, comprising pairs of coils 28, joined by a plurality of soft magnetic cores 30, are disposed along the periphery of the housing 14. According to Faraday's law of induction, the rotating ring of magnets 20 will induce a voltage (or electromotive force) in the coils 28 whose magnitude is proportional to the time rate of change of the magnetic flux within each coil 28 and the number of loops comprising the coil 28. Therefore, the voltage producing potential of the apparatus 10 is a factor of strength of the magnets 20 and how fast they are moving. The magnetic air gap (shown as element 50 in FIG. 5A) is defined as the separation distance between the magnet 20 and the coil 28 or coil core 30. The magnetic air gap consists of not only the actual air gap, but also the thickness of any non-magnetic material contributing to the separation distance between the magnet 20 and the coil 28 or coil core 30. It should also be noted that, true for any embodiment of this invention, if the magnetic air gap is too large with respect the magnet thickness, then magnetic flux will "leak" from one magnet 20 to the nearest magnet 20. Any flux that is leaked rather than passing through the stator coils 28 results in a decrease in efficiency of the apparatus 10. Lighter magnets 20 would have less strength than heavier, thicker magnets 20 made from the same material. However, lighter magnets 20 would require less retaining material to retain them than heavier magnets and would therefore have a smaller magnetic airgap than the heavier magnets. Maximum efficiency of the apparatus 10 would require adjusting the weight and thickness of the magnets 20 and the corresponding magnetic air gap to meet design objectives.

Suitable soft magnetic materials for the rotor back iron 24 or the stator coil cores 30 could be iron, silicon-iron alloys, nickel-iron alloys, iron-cobalt alloys, or any of the commercially available specialty alloys designed for use in electric motors/generators or transformers. These materials have a high relative permeability ranging from over 4000 for silicon-iron to 1,000,000 for some specially processed, amorphous alloys. Such materials provide strong response to the magnetic field created by the permanent magnets and are ideally suited for efficient electric power generation. In addition, iron-rich alloys have the highest saturation magnetization, which enables them to conduct a given amount of flux in a smaller cross sectional area allowing lower total mass of the back iron components. To improve generator performance, these materials may be selected with an optimal combination of both relative permeability and saturation magnetization. Electric currents can be induced in these materials as they respond to changing magnetic fields. This effect is most predominant in the stator cores 30 as they are subject to the oscillating magnetic fields of the rotor magnets 20. These currents, known as eddy currents, are a source of power loss. To minimize the loss due to eddy currents, the soft magnetic materials ideally have a relatively high electrical resistance. Other techniques to reduce eddy currents are to form the soft magnetic components out of laminated sheets or pressed powders in order to confine the motion of free charges in the material. The coils 28 and cores 30 are mated to a stator ring 32 that is disposed concentric with the axis 16. As will be described in greater detail below, the magnitude of flux imparted from the magnets 20 to the coils 28 is at a maximum when the magnets 20 are disposed and rotated coplanar with respect to the coils 28. The stator ring 32 is configured to slide along the axis 16 (in an out of the page, as drawn), so as to modulate the imparted flux by variably departing from the co-planar orientation. As a result, manipulating the spatial orientation of the stator ring 32 with respect to the rotor ring 22, serves to mechanically attenuate the induced voltage in the apparatus 10.

Some embodiments of the disclosed invention may utilize hydraulic actuators to move the stator ring 32 axially with respect to the turbine engine. Other embodiments may use electric actuators or other means known to one of ordinary skill in the art. Regardless of the actuator employed, a bias may be applied to predispose the stator ring 32 to a given position. For example, the stator ring 32 may be biased to be co planar with the rotor ring 22. An actuator may hold the stator ring 32 out of alignment with the rotor ring 22, and upon failure of that actuator, the stator ring will automatically return to the co-planar orientation (thus producing power). Likewise, the stator 32 may be biased into a non-co-planar relationship, so that power production stops in the absence of an affirmative force to overcome the bias. Yet another bias may be employed to facilitate emergency power production. For example, half of the power producing coils may be biased to a co-planer configuration yet may be held out of plane by an actuator and sensor in communication with the turbine engine. When the turbine engine stalls, both halves of coils 28 are brought into the co-planar configuration, thus doubling the power production for a given angular rotation via ram air actuation.

Several advantages are realized by the configuration noted above. By way of example and not limitation, locating the coils 28 and magnets 20 in the region of the turbine engine where the incoming air stream is coolest could obviate oil cooling requirements that are present in many externally driven generators. Also, lubrication systems associated with gearing and rotation of a stand-alone generator are avoided, inasmuch as the disclosed invention use existing pivot points of the turbine engine. The moveable stator ring 32 allows manipulation of the induced voltage to accommodate for varied engine operational speeds. As a result, this reduces the burden placed upon downstream inverter converter controllers or voltage regulators. Embodiments of the disclosed invention may be configured to mechanically terminate essentially all power production, even in the presence of continually moving permanent magnets, by way of the variable stator ring 32. Further, should the turbine stall in an airborne environment, ram air passing through the fan 12 may produce sufficient angular velocity to generate emergency power for the aircraft. It should be noted that emergency power-producing embodiments may employ a fan clutch configured to decouple the fan 12 from the mass of the turbine engine components and shaft.

Some embodiments of the disclosed invention may include a segmented stator ring 32 configured to move one or more coils 28 in an axial direction independent from one or more other coils 28. Independent or quasi-independent control of the coil 28 position may serve several purposes. First, coils 28 may be spatially adjusted to account for any inherent inconsistencies in the coils 28 so that all the coils produce the same voltage. The second benefit is that if a coil 28 is ever shorted, then that coil 28 or coil 28 pair can be removed from the flux path of the magnets 20, in real time, while the remaining coils 28 can be left in the flux path and still generate voltage. Selective removal of defective coils 28 would increase the probability of the apparatus 10 producing sufficient power even if some of the coils have failed. Conversely, independent control of coil 28 position enables the apparatus 10 power output to closely mirror electrical demand during various stages of flight. Alternatively, if individual coil pair movement is not sought, the soft magnetic material comprising the coil cores 30 may be fabricated in such a way as to connect the backsides of all the cores instead of pairs of cores. Such a configuration would be similar to conventional stator core design.

Figure 2:
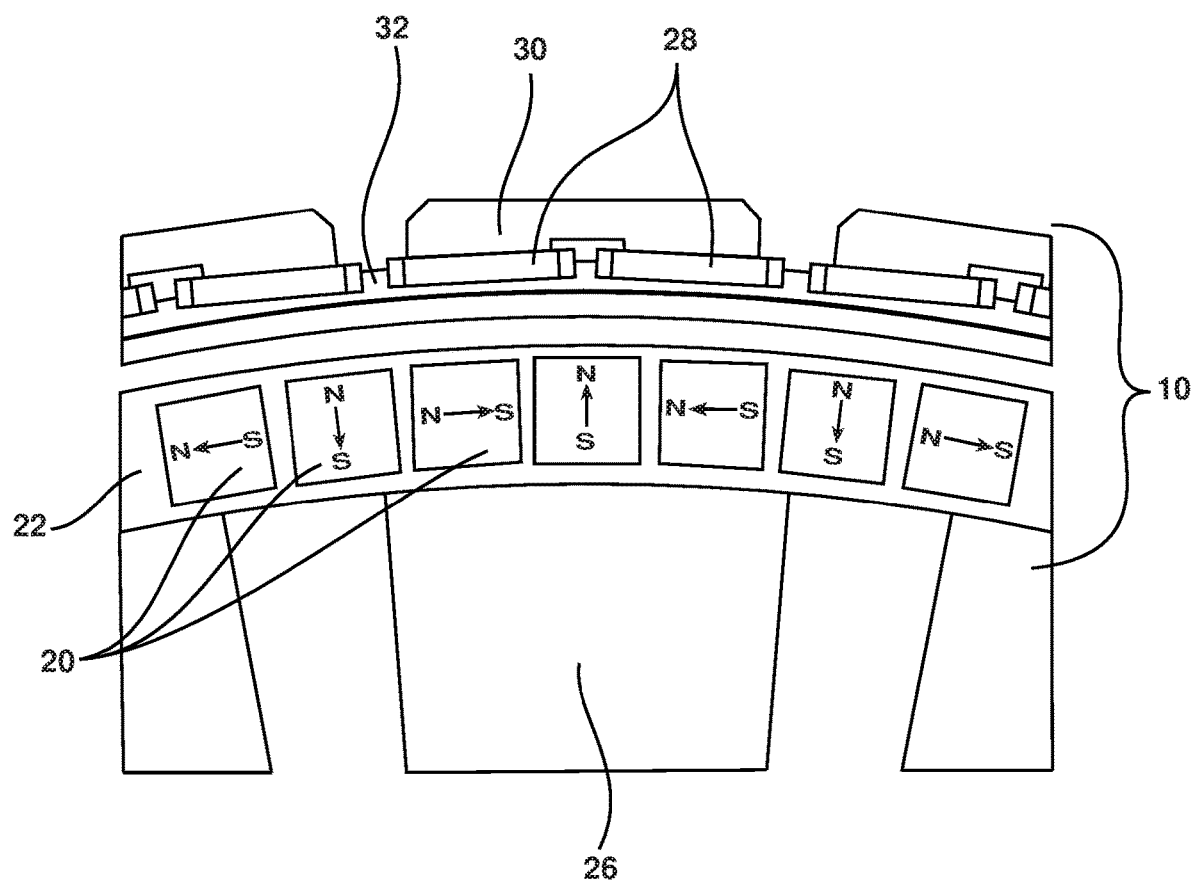
FIG. 2 depicts a magnified view of a portion of a fan including magnets configured in a Halbach array.

Other embodiments may omit the soft magnetic material bridge 24 and substitute magnets 20 arranged in a Halbach array. As seen in FIG. 2, the magnets 20 are arranged in a repeating series of four elements (versus pairs of magnets 20 having opposite polarities, as described above). In this Halbach configuration, field lines between magnets are mostly cancelled, while field lines extending adjacent the coils 28 are summed. The series of four elements shown in FIG. 2 represent the simplest Halbach array for the sake of illustration. It will be recognized that more efficient Halbach arrays can be formed with greater numbers of repeating elements that include elements with interim orientations to those shown in FIG. 2. This configuration, omitting soft magnetic material bridges 24, may yield an overall reduction in mass for the rotor assembly as well as a reduction in manufacturing complexity. In some embodiments, each coil 28 may be coupled to a high efficiency diode array to rectify the current at each coil 28.

Regardless of the means by which magnetic flux is produced and directed, acceptable results are obtained when he number and spacing of the magnets 20 is such that when one coil 28 is aligned with maximum flux, the coil 28 diametrically opposed is also at maximum flux. This will help keep forces on the fan 12 balanced so as to reduce wear and vibration.

Further, coils 28 and magnets 20 may also be arranged so that only one pair of opposing coils 28 is at maximum flux at any given time. This will help reduce the cogging effect on the rotation of the fan 12. This type of spacing arrangement will also stager the voltage peaks produced by each pair of coils 28. Evenly spacing the voltage peaks throughout a revolution of the fan 12 will also smooth out the electrical signal and make the rectified voltage closer to a true dc signal. Other configurations where coils 28 sharing the same magnet 20 phase relationship are not diametrically opposed may be used to create specific AC voltage wave forms. These alternate configurations are feasible if the forces between the rotor magnets 20 and stator coils 28 are balanced with respect to the fan axis 16.

Some embodiments may have sufficient turns of conductor on each coil 28 to produce the desired maximum voltage at the lowest operating engine RPM. This would allow all the coils 28 to be summed in parallel. Paralleling the coils 28 would produce a smoother dc voltage and limit the impact of a shorted coil 28 on the total output of the apparatus 10.

Figures 3A, 3B, 3C:
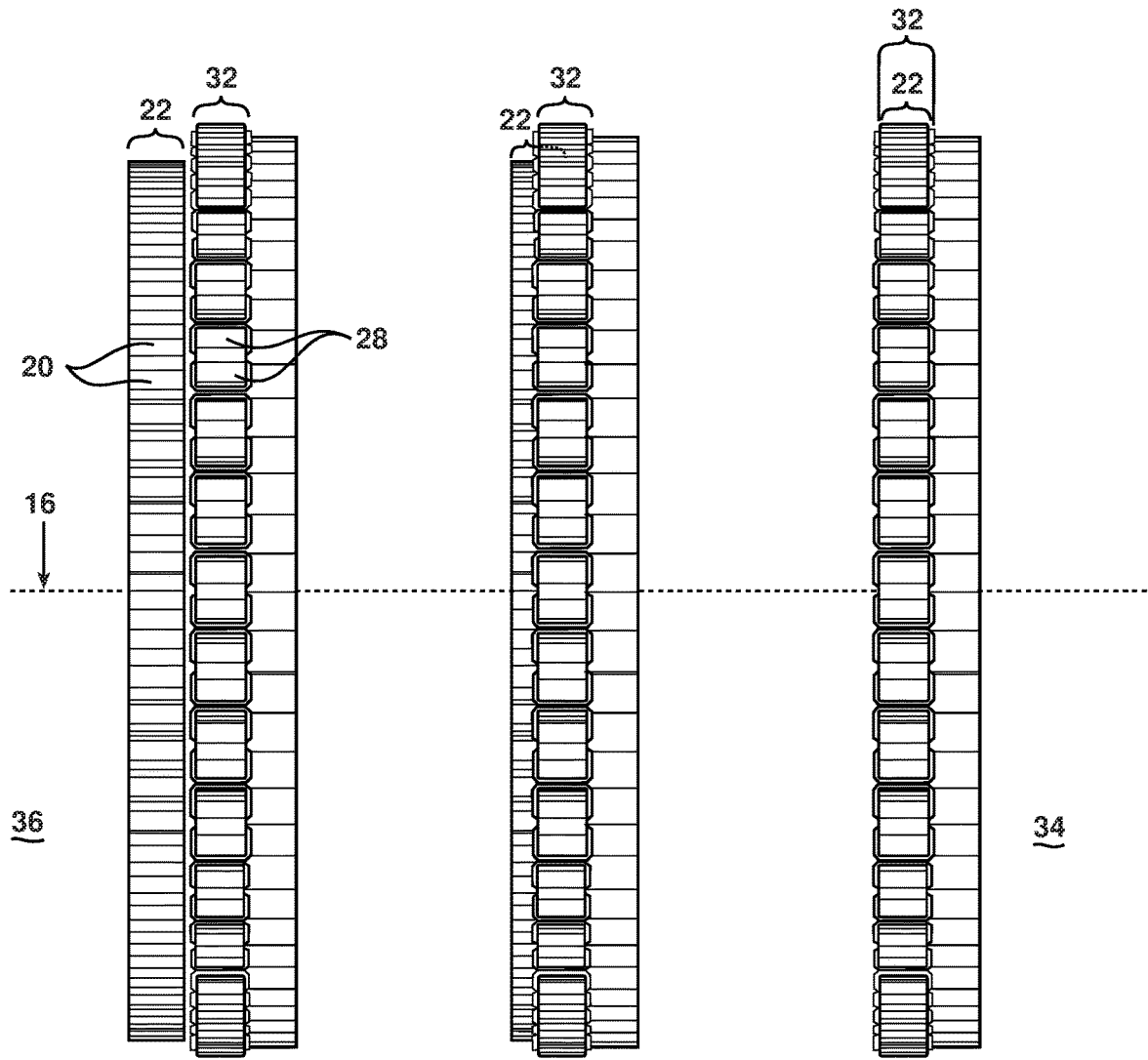
FIGS. 3A-3C depicts an embodiment of the disclosed invention having a stator portion disposed at three positions relative to a rotor portion.

Turning attention to FIG. 3A-3C, each view depicts the spatial relationship between the stator ring 32 and the rotor ring 22 as the stator ring 32 progresses along the central axis 16 from an extreme aft 34 relationship (having no overlap of the stator ring 32 and rotor ring 22) in FIG. 3A, to an intermediate relationship in FIG. 3B, to an extreme forward 36 relationship (having substantially complete overlap of the stator ring 32 and rotor ring 22) in FIG. 3C. As a result of these varied orientations, FIG. 3A depicts the orientation that produces a minimum flux through the coils 28 and therefore minimum voltage. Likewise FIG. 3C depicts the orientation that produces a maximum flux and maximum voltage.

Figure 4:
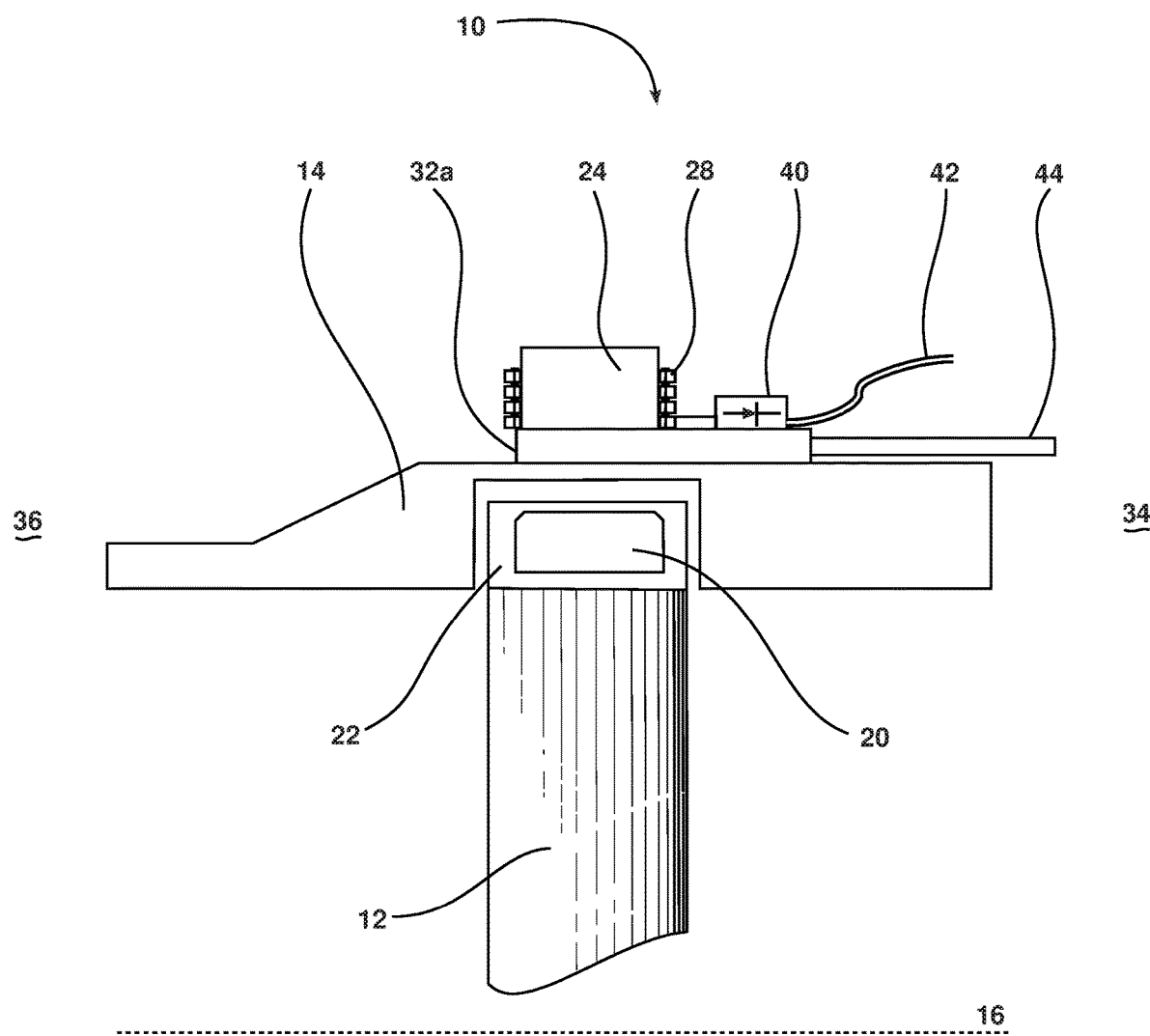
FIG. 4 is a magnified view of a stator coil configured for independent axial motion with respect to the rotor.

As was noted in the discussion above, some embodiments enable the axial movement of individual coils 28, or some other subset of the stator ring 32, to selectively manipulate the flux that is imparted to the coil 28. FIG. 4 illustrates this concept as a single coil 28 coupled to a stator ring portion 32*a* (either a stator ring 32*a* portion sufficient to support a single coil 28, or a larger sub-circumferential segment of the stator ring 32 configured to support a plurality of coils 28). For direct current embodiments, a rectifying diode 40, in electrical communication with the coil 28 is in electrical communication with a flexible conductor 42. It will be recognized by one of ordinary skill in the art that diodes 40 and rectifying means may be omitted for alternating current embodiments. Only one flexible conductor 42 is shown in FIG. 4 for simplicity. However, an additional conductor 42 would also be connected to the other end of the coil 28 wire. The purpose of the flexibility of the conductors 42 is to allow continuous electrical connection to the coil 28 as the coil 28 moves with the stator ring portion 32a. An actuator 44 is configured to reciprocate the stator ring portion 32 fore 36 and aft 34 along the central axis 16. The example shown in FIG. 4 shows the flexible conductor 42 directly leaving the coil 28. Each coil 28 of the apparatus 10 could be configured so that two conductors 42 leave each and travel to some other device where the electrical power is conditioned for distribution or distributed to loads directly. Alternatively, especially if individual coil actuation is sacrificed, the current from the coils may be directed to circuitry on the stator ring 32 itself. In this way, a fewer number of flexible conductors 42 may be used to deliver power from the apparatus 10. Further, especially for DC power generation, a rectifying circuit could be placed on the stator ring 32 or stator ring portion 32a to convert the generated AC voltage and current waveforms into DC. The DC power associated with each coil 28 could then be combined through other conductors on the stator ring 32 and then transmitted away from the apparatus 10 via a minimal number of flexible conductors 42. Or the DC power from each coil 28 or pair of coils 28 could be individually transmitted away from the apparatus via conductors 42 associated with each coil 28 or coil pair 52a-52b (seen in FIG. 5A). Various rectification circuits familiar to one of ordinary skill in the art could be used. The simplest circuits being a half or full-wave rectifier using one or four diodes, respectively.

Figure 5A:
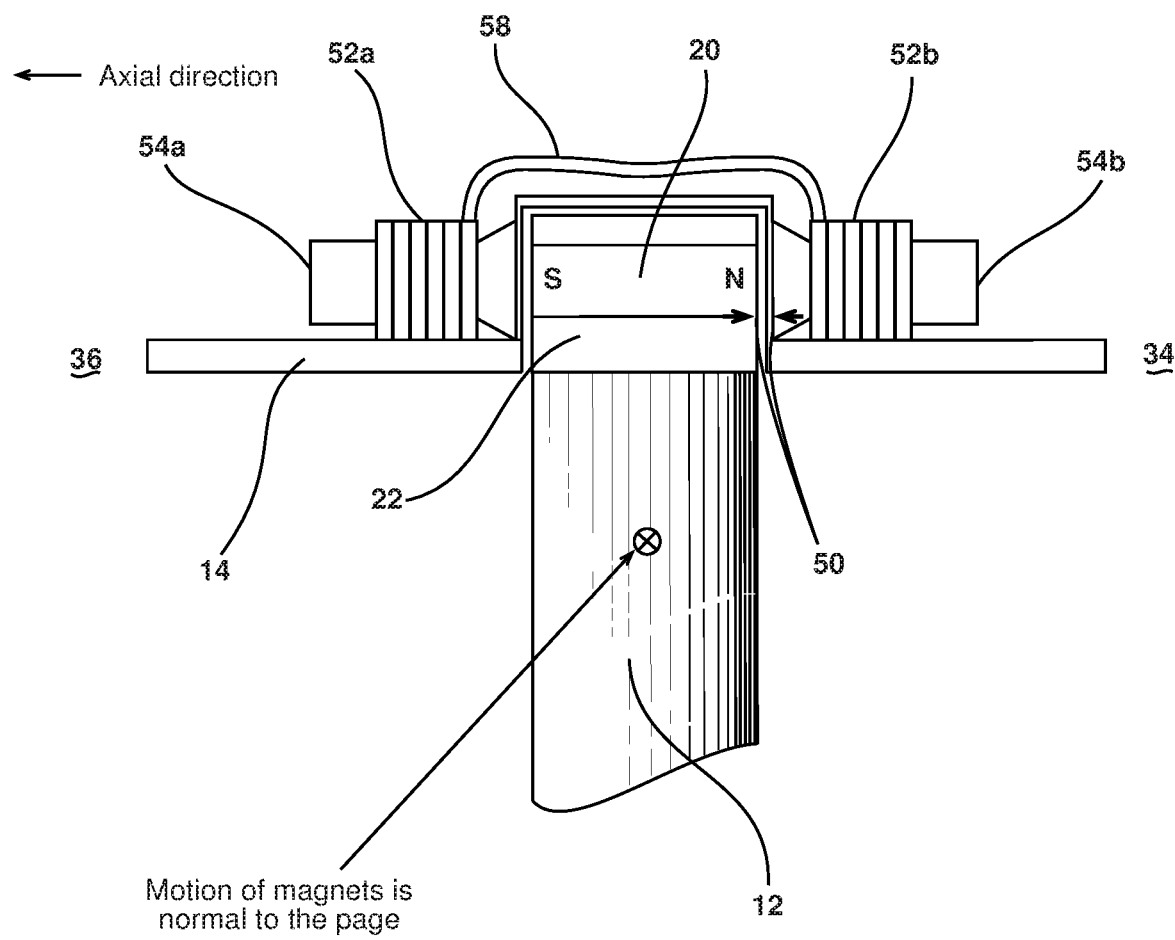
FIGS. 5A-5C shows axial flux split coil embodiments of the disclosed invention.
Figure 5B:
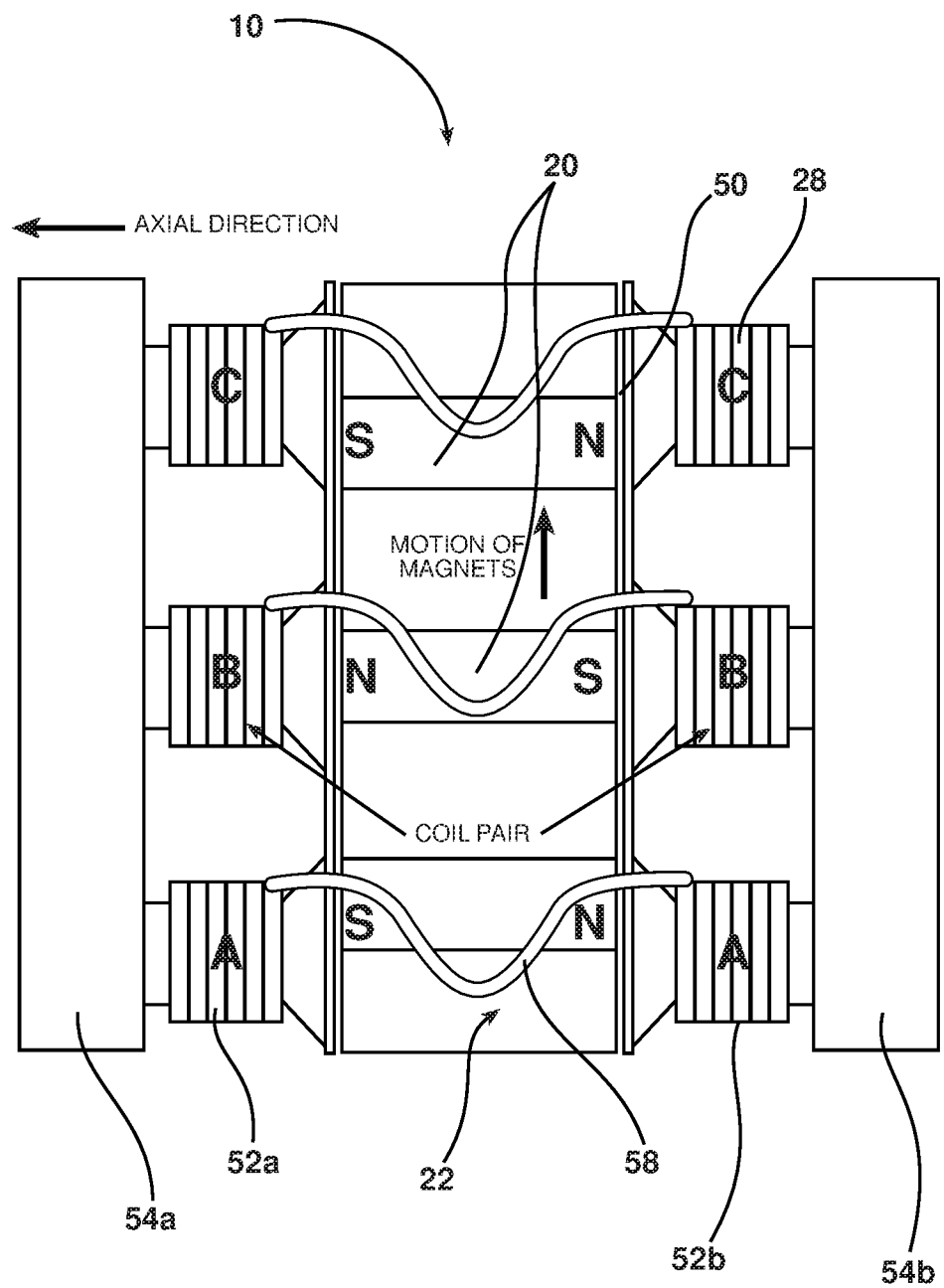
Figure 5C:
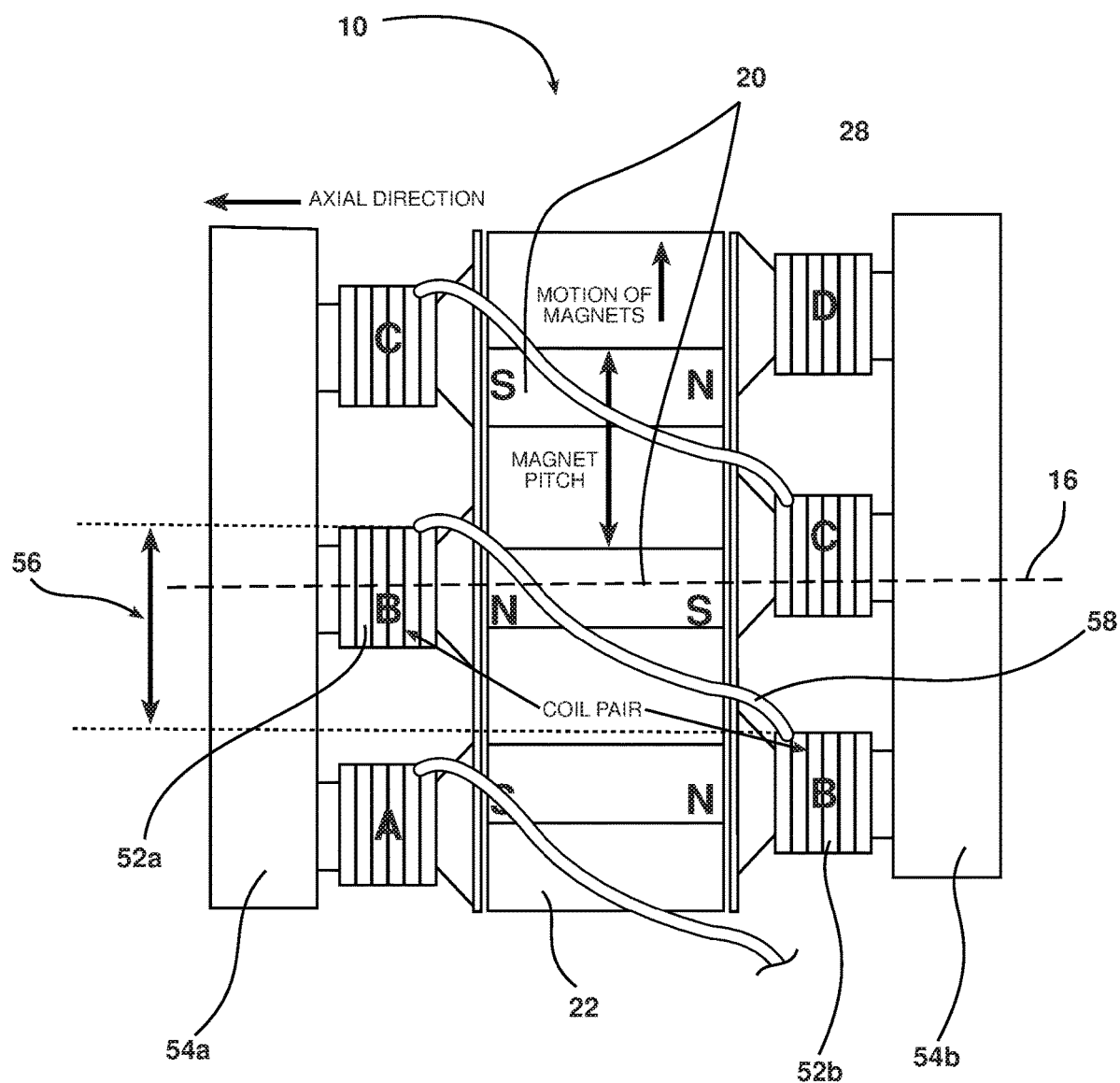

Turning attention to FIG. 5A-5C, some embodiments may be configured to reduce the dimension of the magnetic air gap 50 between the magnet 20 and coil 28 by removing rotor ring 22 material therebetween, thus improving the efficiency of the apparatus 10. Various elements will be called out in the discussion that follows, with FIG. 5A being a cutaway view showing one subset of magnet 20, split coil portions 52a and 52b, and related structures, that are depicted in a macro view via FIGS. 5B-5C. Specifically, split coil portions 52a and 52b are joined by a split coil conductor 58. The magnets 20 may be oriented with alternating polarities as shown in FIG. 5A. Split coil portion 52a is mated to split stator ring 54a, and split coil portion 52b is mated to split stator ring 54b. As shown in FIG. 5B, split coil portion 52a is substantially aligned with split coil portion 52b. This configuration yields maximum voltage production within a coil pair 52a-52b.

In FIG. 5C, split coil 52a has been shifted by a coil offset distance 56 by rotating the split stator ring 54a, the split stator ring 54b, or both, with respect to the central axis 16. It should be noted that split stator ring 54a and split coil 52a may be referred to as a "first stator ring or first stator ring portion" and "first split coil portion" respectively. As the coil offset distance 56 increases upwardly from zero, the produced voltage decreases until the phase shift is sufficient to substantially terminate voltage production. Voltage production is minimized when the split coil portion 52a and the split coil portion 52b to which it is connected by a conductor 58 are aligned with different magnets 20 such that each coil 52a and 52b are facing the same magnet 20 polarity. The smallest offset distance 56 that achieves the minimum voltage output condition will be essentially equal to the center-to-center spacing (or "pitch") of the magnets 20. It should be noted that the orientation of components depicted by FIGS. 5B and 5C may yield more complex flux paths than found in earlier embodiments. As a result, sintered metallic cores and support structures may yield superior results as compared to laminated features. Further modulation of flux through the coils 52 can be accomplished by reciprocating the first or second stator rings axially so as to change the magnitude of the magnetic air gap 50. Increasing the magnetic air gap 50 is not an effective way to decrease the induced voltage in the coils 52 to zero. However, relatively small increases over the minimum magnetic air gap 50 result in dramatic decreases in the power produced by the coils 52 and may be used as an alternative or supplementary method to the radial manipulation of the coil offset distance 56 described above.

Figure 6:
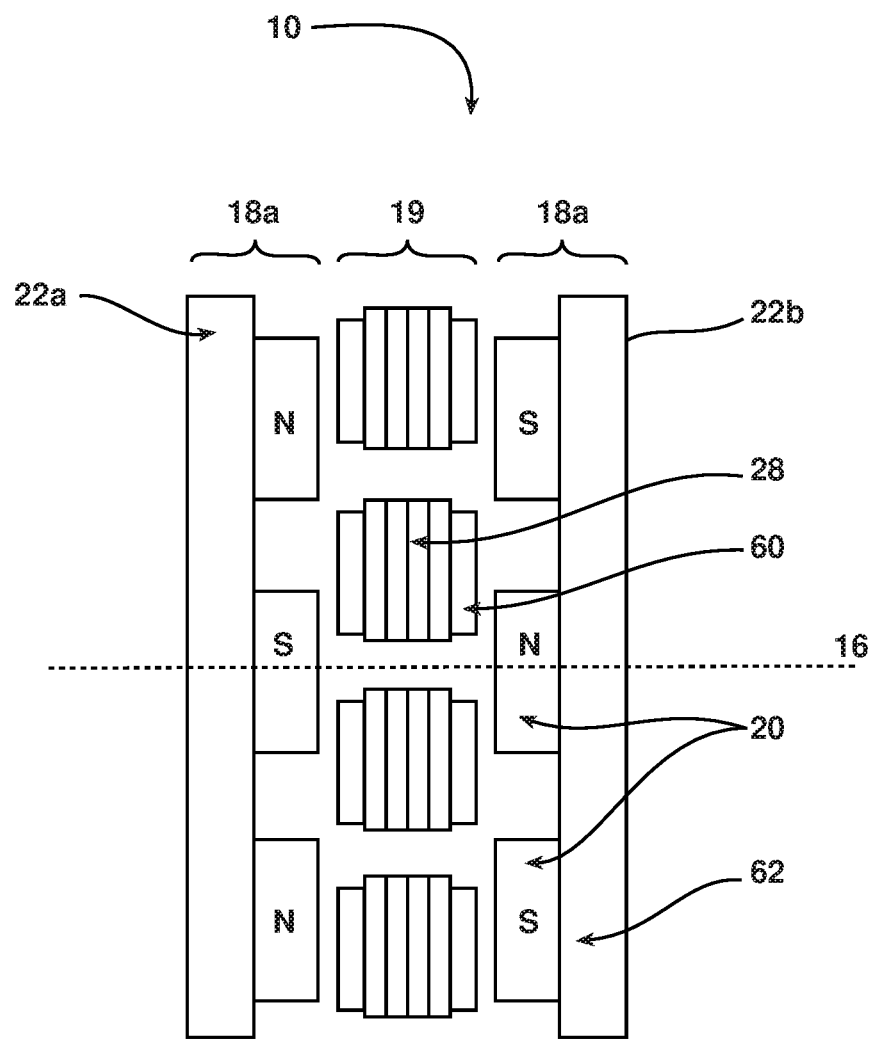
FIG. 6 illustrates an axial flux, split rotor embodiment of the disclosed invention.

Some embodiments may be configured to reduce coil core eddy losses and to enhance the variability of magnetic flux modulation. For example, FIG. 6 depicts an embodiment having coils 28 and individually mated coil cores 60 disposed on the stator portion 19, and magnets 20 disposed on rotor portions 18a and 18b. The rotor portions 18a and 18b are disposed on each side of the stator portion 19 and opposing magnets 20 are configured with alternate polarities.

During operation of the apparatus 10 according to FIG. 6, alternating magnetic flux is produced and Eddy losses are generated only within the volume of the coil cores 60. The large rotor back iron 62 components do not experience alternating magnetic fields, since there is no relative motion of the magnets 20 with respect to the back iron 62. This configuration obviates machining laminated and complex back iron 62 parts and thus simplifies manufacturing of individual coil cores 60 from sintered metal or other low loss material. Further, since the cores 60 of individual coils 28 are not connected to each other via back iron as in FIGS. 5a and 5b, a suitable mechanism can be devised to move the coils 28 and cores 60 radially with respect to the central axis 16. In doing so, the amount of flux passing through, and hence the voltage produced by, the coils 28 can be modulated by the coils 28 and cores 60 into and out of the magnetic flux path of the rotor magnets 20.

It will be recognized by one of ordinary skill in the art that the apparatus 10 may be configured for use as a turbine engine starter. Embodiments that include a slip clutch or other mechanism to decouple the fan from the shaft, to utilize ram air in the event of an engine failure, must be modified to ensure the torque imparted to the fan by the apparatus 10 is transferred to the engine's compressor.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A power producing apparatus, the apparatus comprising:
 a rotor portion including a rotor ring mated to a plurality of rotatable fan blades of a turbine engine, the rotor ring having a plurality of permanent magnets disposed therein in an alternating polarity pattern;

a stator portion including a first stator ring disposed coaxial with, and forward of, the rotor ring, wherein the first stator ring includes a plurality of first split coil portions;

the stator portion further including a second stator ring disposed coaxial with, and aft of, the rotor ring, wherein the second stator ring includes a plurality of second split coil portions; and wherein one or both of the first stator ring and the second stator ring are configured to selectively rotate about a coaxial axis of rotation with respect to one another to adjust circumferential alignment between the first and second split coil portions; and wherein the adjustment of the circumferential alignment of the first and second split coil portions produces a variation in combined voltage output of the stator portion.

2. The power producing apparatus of claim 1, wherein the rotation of the first and second split coil portions relative to one another is operable to vary the voltage output between a maximum voltage and a zero voltage.

3. An apparatus comprising:
a rotor having a rotor ring with a plurality of permanent magnets positioned thereon;
a stator including first and second split stator rings having a plurality of paired coils disposed therewith;
wherein the first split stator ring is positioned forward of the rotor ring and the second split stator ring is positioned aft of the rotor ring such that a plurality of coils is in axial alignment with the permanent magnets; and
wherein the first and second split stator rings are rotatable about an axis of rotation relative to one another to change a circumferential alignment the paired coils.

4. The apparatus of claim 3, wherein rotation of the split stator rings is operable to change a voltage output.

5. The apparatus of claim 4, wherein the rotation of the split stator rings is bounded such that circumferential alignment varies between 100% and 0% alignment.

6. The apparatus of claim 4, wherein voltage output varies from a maximum voltage and zero volts as the circumferential alignment of the paired coils are rotated from 100% alignment to 0% alignment.

* * * * *